(12) United States Patent
Schenk

(10) Patent No.: US 7,977,897 B2
(45) Date of Patent: Jul. 12, 2011

(54) APPARATUS AND METHOD FOR CONTROLLING OR REGULATING AN OSCILLATING DEFLECTABLE MICROMECHANICAL ELEMENT

(75) Inventor: Harald Schenk, Dresden (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 309 days.

(21) Appl. No.: 12/243,308

(22) Filed: Oct. 1, 2008

(65) Prior Publication Data
US 2009/0072769 A1    Mar. 19, 2009

Related U.S. Application Data

(63) Continuation of application No. PCT/DE2006/000674, filed on Apr. 11, 2006.

(51) Int. Cl.
*H02K 33/00* (2006.01)
(52) U.S. Cl. .......................................... 318/119; 318/135
(58) Field of Classification Search .................. 318/119, 318/135; 396/428; 365/200; 358/18
See application file for complete search history.

(56) References Cited

U.S. PATENT DOCUMENTS

| | | |
|---|---|---|
| 6,788,842 B1 | 9/2004 | Sink et al. |
| 2002/0081060 A1 | 6/2002 | Margalit et al. |
| 2003/0042406 A1* | 3/2003 | Charbon .................. 250/214 A |
| 2003/0174376 A1 | 9/2003 | Sane et al. |
| 2004/0174757 A1 | 9/2004 | Garverick et al. |

OTHER PUBLICATIONS

English translation of the International Preliminary Report on Patentability issued in connection with International Application No. PCT/DE2006/000674, from which the present application U.S. Appl. No. 12/243,308, is a continuation.

* cited by examiner

*Primary Examiner* — Karen Masih
(74) *Attorney, Agent, or Firm* — Gauthier & Connors LLP

(57) ABSTRACT

The invention relates to an apparatus and to a method for controlling or regulating the deflection of micromechanically manufactured deflectable elements which, driven electrostatically, are deflected in an oscillating manner. It is the object of the invention to provide a possibility with which a much larger deflection range can be utilized and in so doing the required voltage potential difference for the electrostatic drive of a deflection can be kept small and the occurrence of the pull-in effect can be avoided. In accordance with the invention, a deflectable element is present which is held at a frame element by at least one spring element and which can be deflected using an electrostatic drive. The deflection can be achieved by means of at least one counter-electrode and the deflectable element usable as an electrode. In addition, at least one detector is present which is suitable for the contactless detection of at least one deflection position and which is connected to an electronic evaluation and control unit to influence the electrical voltage potential difference between the deflectable element and the counter-electrode(s) in dependence of a specific deflection position.

16 Claims, 3 Drawing Sheets

APPARATUS AND METHOD FOR CONTROLLING OR REGULATING AN OSCILLATING DEFLECTABLE MICROMECHANICAL ELEMENT

PRIORITY INFORMATION

The present application is a continuation of PCT Application No. PCT/DE2006/000674 filed on Apr. 11, 2006, which is incorporated herein by reference in its entirety.

BACKGROUND OF THE INVENTION

The invention relates to an apparatus and to a method for controlling or regulating the deflection of micromechanically manufactured deflectable elements which, driven electrostatically, are deflected in an oscillating manner. Said elements can in particular be scanner mirrors which can be electrostatically excited to make a resonant vibration. A frequent function is the periodic deflection of a light beam. The invention specifically relates to an avoidance of the deflection restriction of the deflectable element by the so-called electrostatic pull-in effect.

Figure 1:
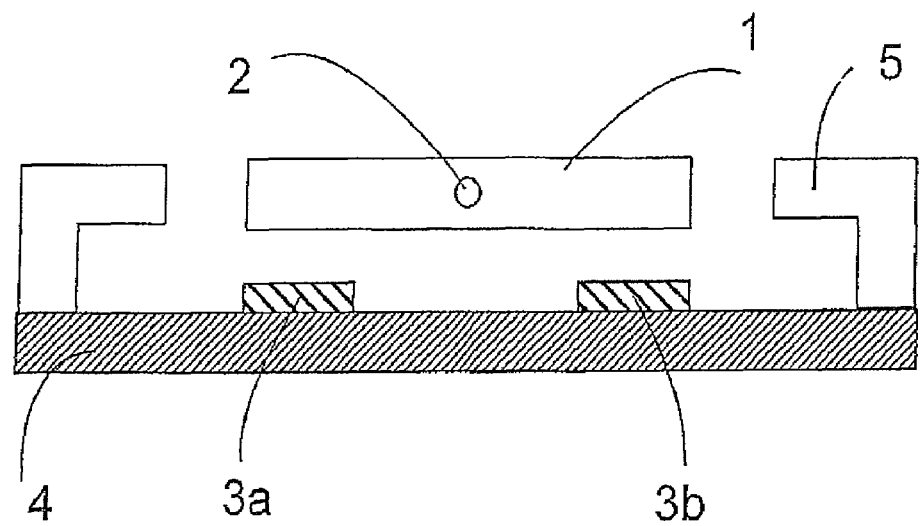

Micromechanical, deflectable elements in many cases have a structure in accordance with FIG. 1. A deflectable element 1 in the form of a plate 1 is rotatably journaled via a torsion spring 2 within a frame element 5. Two counter-electrodes 3a and 3b can be located on a substrate 4 beneath the plate, as a deflectable element 1. If a potential difference of the electrical voltage is applied between the plate and one of the two counter-electrodes 3a or 3b, the plate is deflected in the direction of the respective counter-electrode.

The maximum usable deflection is restricted by the so-called pull-in effect. If the plate, as the deflectable element 1, approaches too closely to one of the counter-electrodes 3a or 3b, the electrostatic force exceeds the mechanical restoring force of the spring elements 2. The system becomes instable; the plate is accelerated toward the counter-electrode 3a or 3b and impacts there. This can result in the destruction of the plate, of the suspension or of the respective counter-electrode 3a or 3b. Due to this pull-in effect, only approximately ⅓ of the actually available distance can be utilized for a deflection—even in dynamic operation.

The maximum usable range for the deflection can only be somewhat increased by a specific design of the counter-electrodes.

With the usable range of the actually available distance restricted due to the pull-in effect, said distance must be comparatively large with a preset maximum deflection. However, this has the result that drive voltages of up to several hundred volts are required even in a dynamic case.

It is the object of the invention to provide a possibility with which a much larger deflection range can be utilized and in so doing the required voltage potential difference for the electrostatic drive of a deflection can be kept small and the occurrence of the pull-in effect can be avoided.

This object is solved in accordance with the invention by an apparatus having the features of claim 1. In this respect, it is possible to proceed in accordance with a method having the features of the claim.

Advantageous embodiments and further developments of the invention can be achieved using features designated in the subordinate claims.

SUMMARY OF THE INVENTION

In the invention, starting from known solutions, at least one detector is additionally used for the contactless detection of at least one deflection position. The electrical voltage potential difference between the respective deflectable element and at least one counter-electrode can be influenced with these signals via an electronic evaluation and control unit. In this connection, the deflectable element can also be used as an electrode. For instance, on detection of a presettable deflection position, a deactivation of the electrical voltage can be initiated at a counter-electrode, which results in the collapse of electrostatic forces and the restoring force of the spring elements prevents a much larger deflection and, with the exception of an inertia-induced further deflection in the direction of the respective counter-electrode, prevents a deflection which would result in damage. After reaching a maximum deflection, the restoring forces of spring elements effect a deflection in the opposite direction. With an element pivotable around an axis, and thus deflectable, the procedure can then be carried out in an analogous manner on a corresponding approximation to a second counter-electrode.

The pull-in effect can also be avoided with larger deflections due to such a direct influence.

In a preferred embodiment, the detection can, for example, be carried out optically, with then at least one optical detector having to be arranged such that a beam of a suitable light source, for example of a laser diode, is directed onto a reflective surface of the deflectable element and, on a preset deflection position of the deflectable element, the beam reflected by the surface impacts the optical detector and the latter generates a corresponding signal which can be utilized for the control or also for the regulation of the deflection of the deflectable element. This can be achieved both with pivotable deflectable elements and also with elements to be deflected which oscillate in translation. In this connection, the beam of the light source should preferably be directed onto the reflective surface at an obliquely inclined angle.

A detection can, however, also be carried out with more than one detector and/or with more than one light source. They should be arranged at different positions in this respect so that correspondingly different deflection positions can be detected. They may be angular amounts by which a deflectable element pivotable around an axis has been pivoted.

However, capacitive, piezoelectric, piezoresistive or magnetic sensors can also be used as suitable contactless detectors, also in combination of different such sensors.

On a capacitive detection of deflection positions, the charge current and/or discharge current of a capacitive detector can be detected and used for the determination.

Deflection positions should advantageously be detected with time resolution. As will be explained by way of example in the following, the deflection speed can thereby also be determined and then also utilized for the control or regulation of the deflection of the deflectable element. In this respect, the detected direction of the deflection movement can also be taken into account.

With the invention, however, at least one further drive can also be provided for the deflection of the deflectable element which can, for example, also be made as an electrostatic drive or as a piezoelectric drive in order thereby to be able to further increase the achievable deflection.

The deflection of a deflectable element can take place only in rotation, only in translation, but also in rotation and translation.

The invention will be explained in more detail by way of example in the following.

DETAILED DESCRIPTION OF THE ILLUSTRATED EMBODIMENTS

Figure 2:
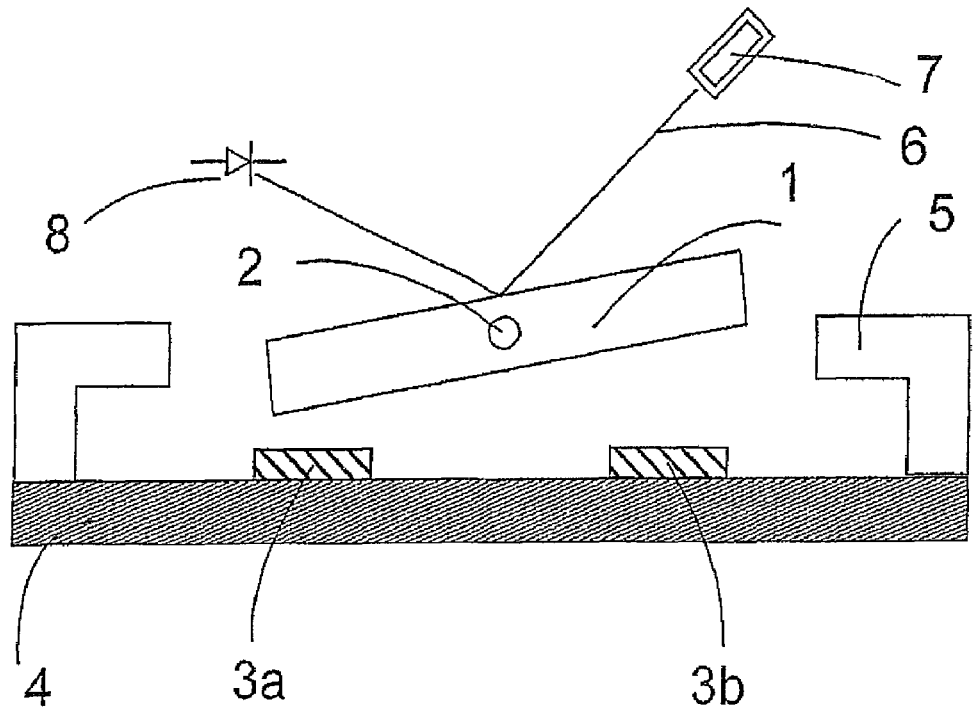
Figure 3:
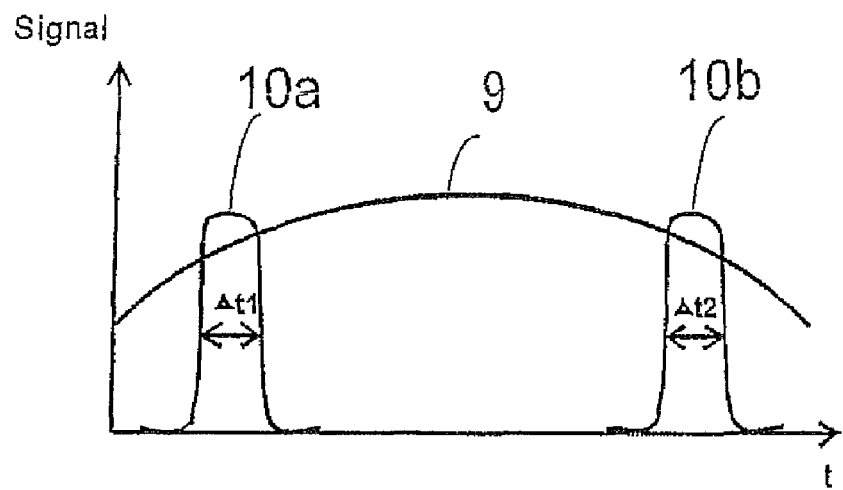
Figure 4:
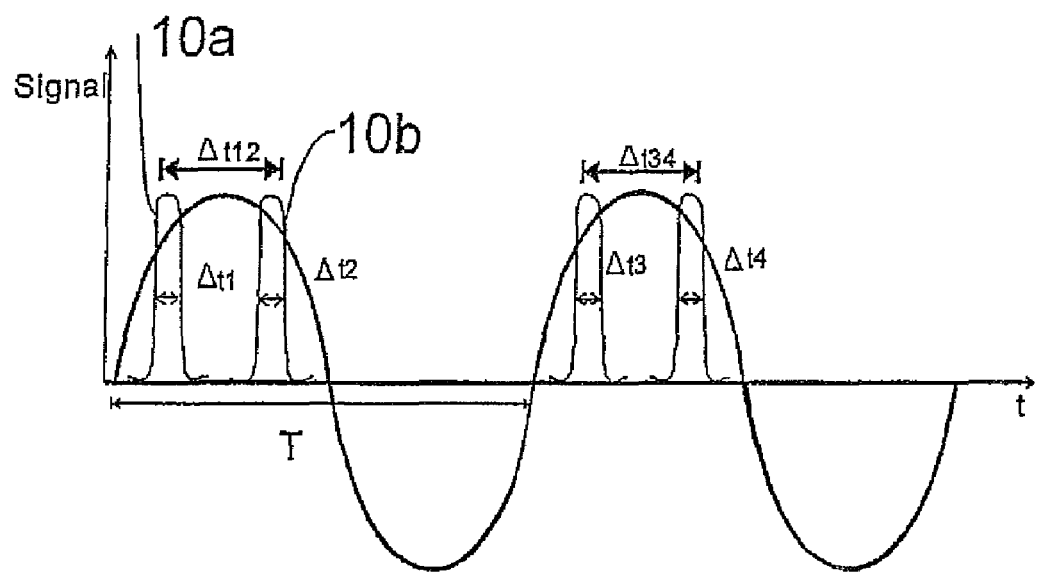
Figure 5:
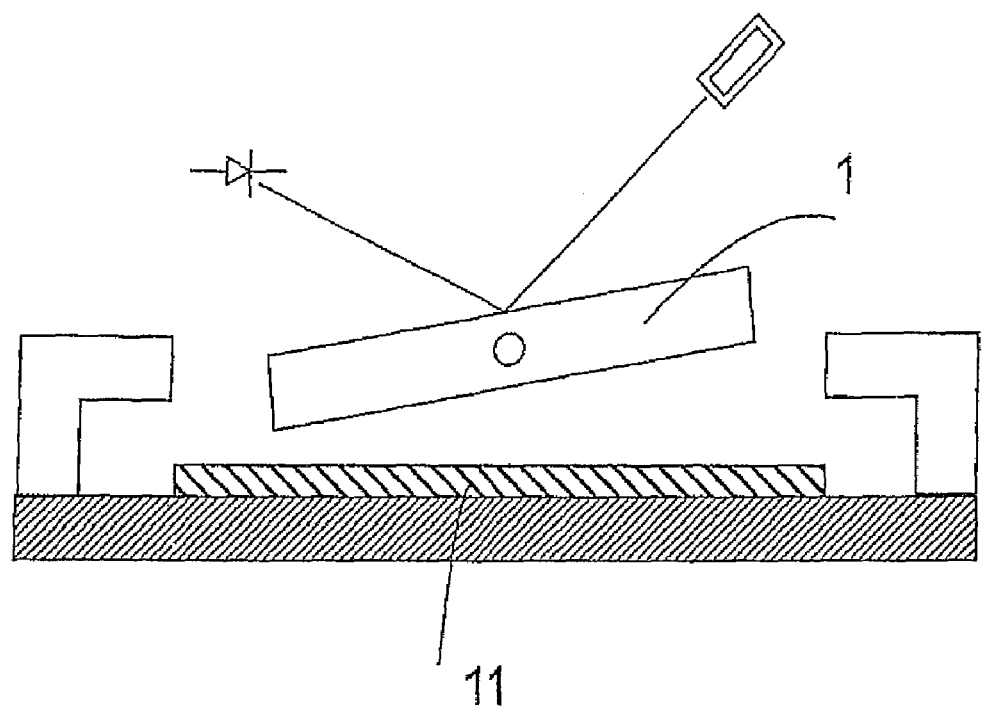

There are shown:

FIG. 1 an example of the prior art in schematic form;

FIG. 2 an example of the invention with optical detection of deflection positions in schematic form;

FIG. 3 the signal curve of optically detected measured signals as has been detected using an apparatus in accordance with FIG. 2;

FIG. 4 a further signal curve of optically detected measured signals as have been detected using an apparatus in accordance with FIG. 2; and FIG. 5 an example with only one counter-electrode in schematic form.

In the examples explained in the following, reference is essentially made to examples in which the deflection of deflectable elements 1 should take place by pivoting around an axis of rotation and the spring elements 2 form torsion spring elements. The invention can, however, also be used with embodiments oscillating in translation. In this connection, a deflectable element is then held by at least one spring element 2 in the form of a bending beam.

FIG. 2 shows an embodiment of an apparatus in accordance with the invention to increase the usable deflection range. The light beam 6 of a laser, as the light source 7, is reflected by the reflective surface of the deflectable element 1 and impacts a photodetector as an optical detector 8. The arrangement is selected such that the laser beam 6 impacts the photodetector 8 just before the deflectable element 1 has been deflected by a value if the electrostatic stability allows (typically this is approximately ⅓ of the electrode spacing). The signal at the optical detector 8 is utilized as a trigger to deactivate the electrical voltage between the deflectable element 1 and the counter-electrode 3a. The deflectable element 1 can oscillate further in the direction of the counter-electrode 3a without any applied electrical voltage without the mentioned pull-in effect occurring. Approximately at the reverse point of the oscillation of the deflectable element 1, the electrical voltage between the deflectable element 1 and the counter-electrode 3b is switched on or the electrical voltage potential difference is increased.

FIG. 3 shows the signal curve at the photodetector 8 and the oscillation curve 9 of the deflectable element 1 on the deflection for an embodiment in accordance with FIG. 2. If the deflectable element 1 is pivoted to the left, the laser beam 6 is incident on the photodetector 8 at a specific deflection (angle+ α). On the passing of the photodetector 8, the signal 10a is generated there. The deflectable element 1 oscillates further to the left and the laser beam 6 exits the photosensitive surface of the detector 8. After reaching the reverse point, the deflectable element 1 oscillates to the right and passes the photodetector 8 again at +α. The signal 10b is generated in so doing.

The deactivation of the electrical voltage between the deflectable element 1 and the counter-electrode 3a is triggered by the signal 10a. The electrostatic pull-in effect is prevented with a suitable arrangement, that is, at a position from which a preset deflection position can be detected using the photodetector 8. Simultaneously or with a delay, the electrical voltage between the deflectable element 1 and the counter-electrode 3b is activated or the electrical voltage potential difference is increased and the deflectable element 1 is thus accelerated in the direction of the counter-electrode 3b.

To be able to use the same method on the left hand side, a further laser diode and a further photodetector can be arranged in a mirrored configuration.

This means that a signal is likewise generated on a deflection by an angle−α. This is not shown in FIG. 2.

Alternatively to the mirror-symmetrical arrangement of two laser diodes, as light sources 7, and two photodetectors 8, it is, however, also possible to work with only one light source 7 and the position of a second photodetector 8 can be selected such that the laser beam 6 impacts it when the deflectable element 1 is deflected by the angle−α.

A further alternative is to use two laser diodes, as light sources 7, and only one photodetector 8. In this connection, the elements are arranged such that a photodetector 8 is impacted by the beam of the first laser diode at an angle+α and by the beam 6 of a second laser diode 7 at an angle−α.

Furthermore, there is the possibility with the configuration shown in FIG. 2 to determine the deactivation time for the deflection by the angle−α from the oscillation curve of the deflectable element 1.

This should be explained in the following with reference to FIG. 4. FIG. 4 represents the signal curve as in FIG. 3, but for a longer period of time. The time interval of the signals 10a and 10b amounts to Δt12. No signal can be detected in the subsequent half-period since the deflectable element 1 is pivoted to the right. Subsequently, the two signals can again be detected by the photodetector 8. The oscillation period T can be derived from the periodicity. Assuming a sinusoidal oscillation of the deflectable element 1, it applies to the deflection angle Φ:

$$\Phi = \Phi_0 * \sin(2\pi/T * t) \quad (1)$$

Thus, and while using T, α and Δt12, the oscillation amplitude $\Phi_0$ can be determined expressed as:

$$\Phi_0 = \alpha / \cos(\pi/T * \Delta t12) \quad (2)$$

The oscillation curve in accordance with equation (1) can be described completely with a known oscillation amplitude $\Phi_0$ and a period duration T. Since moreover the time is known at which the angle α is reached, the deflection angle can be calculated for any desired time. This means that the use of further photodetectors 8 and/or laser diodes 7 can be dispensed with for the determination of the time for the deactivation of the electrical voltage between the deflectable element 1 and the counter-electrode 3b.

It must additionally be mentioned that differential photodiodes can preferably be used as the photodetectors 8 which deliver a very sharp output signal, i.e. the signal width (Δt1, Δt2, . . . ) is significantly lower than that shown schematically in FIGS. 3 and 4.

If, in contrast, simple photodiodes 8 are used, the signal has a width (Δt1, Δt2, . . . ) which, with a suitable geometrical arrangement is approximately inversely proportional to the speed of the deflection of the deflectable element 1. The information on the speed can likewise or additionally be used for the derivation/calculation of the respective deflection position.

A plurality of photodetectors 8 and/or lasers 7 can be used to increase the accuracy of the position readout or position determination.

In addition, the oscillation amplitude can be regulated directly via a photodetector 8 using the method described. For this purpose, the rising flank of the photodetector signal can be used in a closed regulation loop: The desired value, for example, corresponds to half the maximum of the photodetector signal. Starting from a state of rest of the deflectable element 1, this starts to oscillate on excitation, with the amplitude increasing due to a slowly increasing electrical drive voltage. From a specific amplitude of the deflection, the laser beam 6 reaches the photosensitive surface of the detector 8.

Since it is not the total laser spot which impacts the photosensitive surface, the resulting signal is smaller than the defined desired value with respect to its peak value. In this case, the regulation loop of the electronic evaluation and control unit will further increase the electrical drive voltage. As soon as the amplitude of the deflection is so large that the laser spot covers approximately half the photosensitive surface of the detector 8, the desired value has been reached. If the amplitude of the deflection is larger, too large a peak value of the signal thus results in a reduction of the electrical drive voltage within the closed regulation loop.

The amplitude regulation can also be controlled and regulated, instead of using a photodiode 8 which is impacted directly by the laser beam 6 on the desired deflection, via a determination of the amplitude from the oscillation curve of the deflection, e.g. according to equation (2).

This procedure has the advantage of greater flexibility. The desired amplitude of the deflection can thus be changed without changing the position of the photodiode(s) 8. The desired amplitude can e.g. be changed via the value of a comparison voltage supplied in an analog or digital manner.

The following request can, for example, also be implemented, with the deflectable element 1 having to have an oscillation amplitude in resonant operation which corresponds to 60% of the distance between the deflectable element 1 and the counter-electrode(s) 3a or 3b in the non-deflected state.

This is possible directly using the last described method—the calculation of the oscillation amplitude. That is, on the one hand, the determined signals are used for the determination of the deactivation time of the electrical voltage; on the other hand, to adapt the level of the electrical drive voltage dynamically—for example in a closed regulation loop—such that the desired oscillation amplitude is reached and maintained.

The same can be achieved in that an additional photodetector 8 is used which is impacted directly by the beam 6 of a laser diode 7 when the desired deflection has been reached.

Finally, it must be mentioned that when an apparatus is used which allows a conclusion on the deflection position of the deflectable element 1, the use of the counter-electrodes 3a and 3b is not absolutely necessary. Instead of two counter-electrodes 3a and 3b, a single areal counter-electrode 11 can be used, as is shown in FIG. 5. This substantially simplifies the setup and connection engineering. The switching times for the electrostatic drive voltage should be adapted to this geometry.

If a deflectable element is not deflected in a manner not oscillating in rotation, but in translation, i.e. parallel to the surface of the deflectable element, an areal electrode is preferably attached below the deflectable element 1. The deflection position of the deflectable element can be determined magnetically, piezoelectrically, capacitively, optically or magnetoresistively. With an optical determination, a Michelson interferometer assembly can, for example, be used in which a first part beam is incident onto a stationary reflective element and a second part beam of electromagnetic radiation is incident onto the deflectable element 1. Due to superimposition of the part beams at the location of an optical detector, interference patterns arise from which the deflection position of the deflectable element 1 can be determined.

The invention claimed is:

1. An apparatus for the control or regulation of a micromechanical element which can be deflected in an oscillating manner and which is held at a frame element by at least one spring element and is arranged at a distance from the deflectable element usable as an electrode for an electrostatic drive for the deflection of at least one counter-electrode, wherein at least one detector suitable for the contactless detection of at least one deflection position of the deflectable element is connected to an electronic evaluation and control unit to influence the electrical voltage potential difference between the deflectable element and the counter-electrode(s) in dependence on the determined deflection position(s).

2. An apparatus in accordance with claim 1, wherein a beam of a light source is directed to a reflective surface of the deflectable element and the beam reflected from this is incident onto an optical detector for the determination of a deflection position at a deflection position of the deflectable element.

3. An apparatus in accordance with claim 1, wherein at least two optical detectors for the detection of deflection positions are present.

4. An apparatus in accordance with claim 1, wherein beams from at least two light sources arranged in different positions reflected by the deflectable element are detectable by at least one optical detector.

5. An apparatus in accordance with claim 1, wherein the detector(s) is/are made as a capacitive, piezoelectric, piezoresistive and/or magnetic detector.

6. An apparatus in accordance with claim 1, wherein the optical detector(s) is/are made as a differential photodiode.

7. An apparatus in accordance with claim 1, wherein at least one further drive for the deflection of the deflectable element is present.

8. An apparatus in accordance with claim 1, wherein the deflectable element can be deflected in rotation and/or translation.

9. A method for the control or regulation of a micromechanical element which can be deflected in an oscillating manner and which is held at a frame element by at least one spring element and is arranged at a distance from the deflectable element usable as an electrode for an electrostatic drive for the deflection of at least one counter-electrode, comprising:
determining at least one deflection position of the deflectable element using at least one detector detecting in a contactless manner and the electrical voltage potential difference between the deflectable element and the counter electrode(s) is influenced in dependence on the determined deflection position(s) such that pull-in effect is avoided.

10. A method in accordance with claim 9, wherein when a preset deflection of the deflectable element is reached or exceeded, the electrical voltage at the one or at a counter-electrode and/or the electrical voltage at the deflectable element is reduced or is completely deactivated until, as a result of the restoring force of the spring element(s), at least one deflection position not reaching the preset deflection has been detected.

11. A method in accordance with claim 9, wherein deflection positions are detected in time resolution.

12. A method in accordance with claim 9, wherein the deflection speed is determined in at least one deflection range of the deflectable element.

13. A method in accordance with claim 12, wherein the electrical voltage potential difference between the deflectable element and the counter-electrode(s) is controlled or regulated using the determined deflection speed.

14. A method in accordance with claim 9, wherein the amplitude of the deflection of the deflectable element is regulated or controlled.

15. A method in accordance with claim 9, wherein the charge current and/or discharge current of a capacitive detector is detected with a capacitive detection of deflection positions.

16. A method in accordance with claim 9, wherein the rising flank of a signal of a detector is used in a closed regulation loop.

* * * * *